US012748632B2

(12) United States Patent
Wang et al.

(10) Patent No.: US 12,748,632 B2
(45) Date of Patent: Sep. 29, 2026

(54) SANDBOXING FOR SEPARATING ACCESS TO TRUSTED AND UNTRUSTED WEARABLE PERIPHERALS

(71) Applicant: Google LLC, Mountain View, CA (US)

(72) Inventors: Charlie Gengzao Wang, Fremont, CA (US); Mark Sander Urbanus, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 23 days.

(21) Appl. No.: 18/859,082

(22) PCT Filed: Apr. 25, 2023

(86) PCT No.: PCT/US2023/019832

§ 371 (c)(1),
(2) Date: Oct. 22, 2024

(87) PCT Pub. No.: WO2023/211957

PCT Pub. Date: Nov. 2, 2023

(65) Prior Publication Data

US 2025/0232028 A1 Jul. 17, 2025

Related U.S. Application Data

(60) Provisional application No. 63/363,592, filed on Apr. 26, 2022.

(51) Int. Cl.

| | |
|---|---|
| ***G06F 21/53*** | (2013.01) |
| ***G02B 27/01*** | (2006.01) |
| ***G06F 1/16*** | (2006.01) |
| ***G06F 3/01*** | (2006.01) |
| ***G06F 9/455*** | (2018.01) |
| ***G06F 9/50*** | (2006.01) |

(Continued)

(52) U.S. Cl.
CPC ........... *G06F 9/505* (2013.01); *G02B 27/017* (2013.01); *G06F 1/163* (2013.01); *G06F 3/012* (2013.01);

(Continued)

(58) Field of Classification Search
CPC .......... G06F 9/505; G06F 1/163; G06F 3/012; G06F 3/013; G06F 9/45558;

(Continued)

(56) References Cited

U.S. PATENT DOCUMENTS 12,412,465 B1 * 9/2025 Daoura .................... H04W 4/80
12,517,972 B2 * 1/2026 Shribman ............. G06F 16/955

(Continued)

FOREIGN PATENT DOCUMENTS

EP 3308312 B1 11/2021

OTHER PUBLICATIONS

International Search Report and Written Opinion for PCT Application No. PCT/US2023/019832, mailed on Aug. 1, 2023, 16 pages.

(Continued)

*Primary Examiner* — Stephen T Gundry
(74) *Attorney, Agent, or Firm* — BRAKE HUGHES BELLERMANN LLP

(57) ABSTRACT

Techniques include adding a trusted wearable services module to a sandbox/isolated module on the companion device. e.g., to Private Compute Core. This trusted wearable services module has a secure connection to the camera on the wearable device and prevents other modules on the companion device from viewing the private data. The trusted wearable services has the ability to encrypt and decrypt data from the camera and also performs the processing used to determine user context in an ambient sensing situation.

24 Claims, 8 Drawing Sheets

(51) Int. Cl.

| | |
|---|---|
| ***G06F 9/54*** | (2006.01) |
| ***G06T 5/50*** | (2006.01) |
| ***G06T 9/00*** | (2006.01) |
| ***G06T 17/00*** | (2006.01) |

(52) U.S. Cl.

CPC .......... *G06F 3/013* (2013.01); *G06F 9/45558* (2013.01); *G06F 9/5027* (2013.01); *G06F 9/54* (2013.01); *G06F 21/53* (2013.01); *G06T 5/50* (2013.01); *G06T 9/00* (2013.01); *G06T 17/00* (2013.01); *G02B 2027/0178* (2013.01); *G06F 2209/508* (2013.01); *G06F 2209/509* (2013.01); *G06F 2209/544* (2013.01); *G06F 2221/034* (2013.01); *G06T 2207/20221* (2013.01)

(58) Field of Classification Search

CPC .......... G06F 9/5027; G06F 9/54; G06F 21/53; G02B 27/017; G06T 5/50; G06T 9/00; G06T 17/00

See application file for complete search history.

(56) References Cited

U.S. PATENT DOCUMENTS

| | | | | |
|---|---|---|---|---|
| 2016/0364559 | A1* | 12/2016 | Bali | G06F 21/62 |
| 2020/0134230 | A1* | 4/2020 | Booth, Jr. | G06F 21/6245 |
| 2020/0272821 | A1* | 8/2020 | Gibbon | G06V 30/19173 |
| 2025/0139303 | A1* | 5/2025 | Mathur | G06F 21/6245 |
| 2025/0265339 | A1* | 8/2025 | Ben-Noon | H04L 63/20 |
| 2025/0293894 | A1* | 9/2025 | Lal | H04L 9/3271 |
| 2025/0301119 | A1* | 9/2025 | Kang | G06V 40/18 |
| 2025/0317280 | A1* | 10/2025 | J | H04L 9/0852 |
| 2025/0337595 | A1* | 10/2025 | S | H04L 9/0631 |
| 2025/0343784 | A1* | 11/2025 | Pismenny | H04L 63/0428 |
| 2025/0348589 | A1* | 11/2025 | Dunning | G06F 21/53 |
| 2025/0350600 | A1* | 11/2025 | Sheehan | G06Q 50/265 |
| 2025/0356011 | A1* | 11/2025 | Keith, Jr. | H04L 9/3271 |
| 2025/0371047 | A1* | 12/2025 | Malleshaiah | G06F 16/33295 |
| 2025/0378180 | A1* | 12/2025 | Chang | G06F 21/602 |
| 2025/0380014 | A1* | 12/2025 | Bartlet | H04L 9/0825 |
| 2025/0384758 | A1* | 12/2025 | Tengstrand | G08B 21/24 |
| 2025/0386167 | A1* | 12/2025 | Smith, III | H04W 4/029 |
| 2026/0006005 | A1* | 1/2026 | Sheehan | H04L 63/0421 |
| 2026/0006018 | A1* | 1/2026 | O'Donovan | H04L 63/0807 |

OTHER PUBLICATIONS

Lee, et al., "TNPU: Supporting Trusted Execution With Tree-Less Integrity Protection for Neural Processing Unit", 2022 IEEE International Symposium on High-Performance Computer Architecture (HPCA), 2022, pp. 229-243.

* cited by examiner

SANDBOXING FOR SEPARATING ACCESS TO TRUSTED AND UNTRUSTED WEARABLE PERIPHERALS

CROSS-REFERENCE TO RELATED APPLICATIONS

This application is a 35 U.S.C. § 371 National Phase Entry Application from PCT/US2023/019832, filed on Apr. 25, 2023, entitled "SANDBOXING FOR SEPARATING ACCESS TO TRUSTED AND UNTRUSTED WEARABLE PERIPHERALS", which claims the benefit of U.S. Provisional Patent Application No. 63/363,592, filed on Apr. 26, 2022, entitled "SPLIT-COMPUTE ARCHITECTURE", the disclosures of which are incorporated by reference herein in their entirety.

TECHNICAL FIELD

This description relates in general to wearable devices and companion devices, and in particular, to companion devices that perform sandboxing of sensor data received from wearable devices.

BACKGROUND

There are several privacy modes of data usage for a wearable device, including recording, intentional sensing, and ambient sensing. Recording refers to the saving of photos or video generated by a world-facing camera of the wearable device. Intentional sensing refers to usage such as object detection in which images are used for machine learning processing but are not being saved. Ambient sensing refers to usage that determines a context in which the user is operating. For example, the user may be driving, and the wearable device may detect that the user is driving. Such detection may occur without the user doing anything or without the user's knowledge. Images taken with a world-facing camera are not saved.

SUMMARY

This application is directed to private data usage in a wearable device (e.g., smartglasses). In some cases, it is desirable to determine a user context in a given situation. For example, it may be desired to determine whether a user is driving a vehicle without asking the user for input. In this case, the determination may be made based on images taken with a world-facing camera and data from an IMU. In some implementations, the determination may be made based on audio data obtained with a microphone. To preserve battery on the wearable device, however, the determination may be made on a companion device such as a smartphone connected to the wearable device, on which runs an application that takes images and IMU data and determines whether the user is driving. A complication arises when there is a bystander in the images—the use of such images may violate the privacy of the bystander. In such a case, the image data is encrypted and sent to an isolated (sandboxed) module over a secure connection, e.g., using transport layer security (TLS) protocol. The isolated module on the companion device can only share a limited set of data—e.g., user context data is shared but not the image data that could violate the bystander's privacy—with other modules on the companion device such a manager modules that request and work with the determined user context. The "isolated module" thus is a "secure module" configured to securely process sensor data (e.g., without sharing the sensor data with other components). The determination of the user context is made by the isolated module based on the encrypted image data. In some implementations, the isolated module decrypts the encrypted image data prior to performing the determination of the user context. Once the user context is determined, the isolated module sends data representing the user context to the manager module.

In one general aspect. a method includes receiving, by an isolated module of a companion device connected to a wearable device, a request from a manager module of the companion device to determine a user context of a user wearing the wearable device, the isolated module not sharing sensor data with the manager module, the user context including an environment in which the user is using the wearable device. The method also includes receiving, from the wearable device (and e.g., by the isolated module), encrypted sensor data acquired with a sensor of the wearable device, the encrypted sensor data being sensor data acquired from a sensor and encrypted. The method further includes determining the user context based on the sensor data (e.g., by the isolated module).

In another general aspect, computer program product comprising a nontransitory storage medium, the computer program product including code that, when executed by at least one processor, causes the at least one processor to perform a method. The method includes receiving, by an isolated module of a companion device connected to a wearable device, a request from a manager module of the companion device to determine a user context of a user wearing the wearable device, the isolated module not sharing sensor data with the manager module, the user context including an environment in which the user is using the wearable device. The method also includes receiving, from the wearable device, encrypted sensor data acquired with a sensor of the wearable device, the encrypted sensor data being sensor data acquired from a sensor and encrypted. The method further includes determining the user context based on the sensor data.

In another general aspect, an apparatus includes memory and processing circuitry coupled to the memory. The processing circuitry is configured to receive, by an isolated module of a companion device connected to a wearable device, a request from a manager module of the companion device to determine a user context of a user wearing the wearable device, the isolated module not sharing sensor data with the manager module, the user context including an environment in which the user is using the wearable device. The processing circuitry is also configured to receive, from the wearable device, encrypted sensor data acquired with a sensor of the wearable device, the encrypted sensor data being sensor data acquired from a sensor and encrypted. The processing circuitry is further configured to determine the user context based on the sensor data.

The details of one or more implementations are set forth in the accompanying drawings and the description below. Other features will be apparent from the description and drawings, and from the claims.

DETAILED DESCRIPTION

Figure 1A:
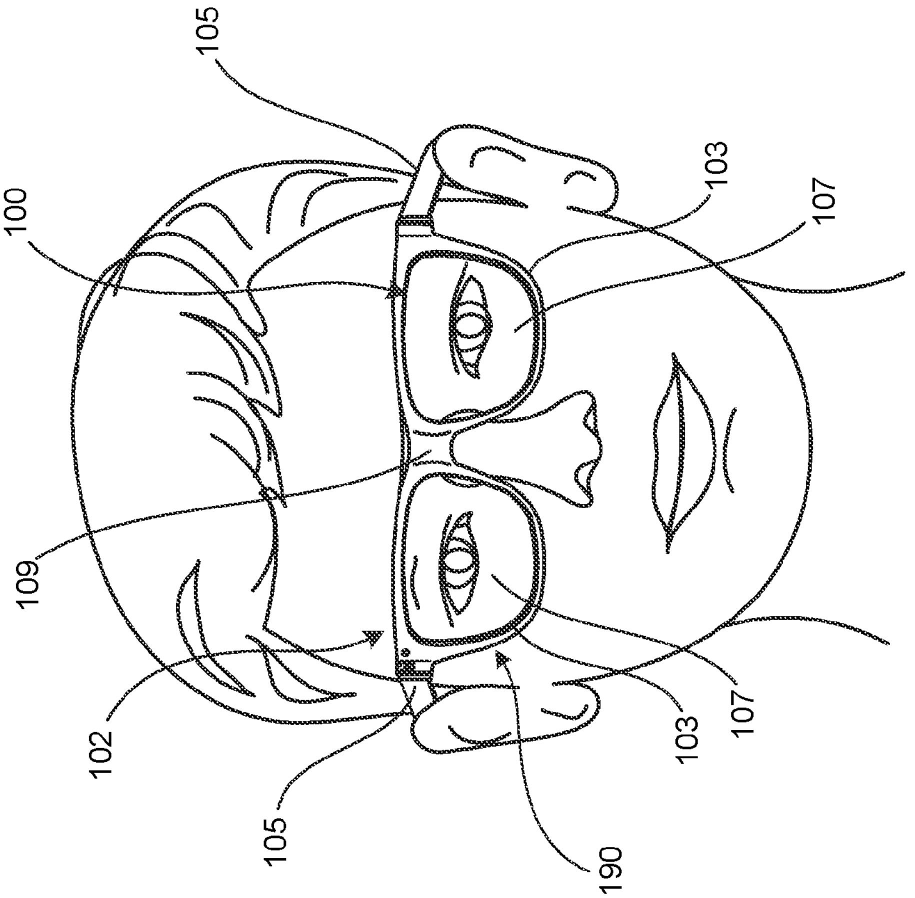
FIG. 1A is a diagram that illustrates an example system, in accordance with implementations described herein.

This disclosure relates to private data usage in a wearable device (e.g., head mounted device (HMD), augmented reality (AR) smartglasses). There are several privacy modes of data usage for a wearable device, including recording, intentional sensing, and ambient sensing.

Recording refers to the saving of photos or video generated by a world-facing camera of the wearable device. In this case, a bystander indicator such as an LED communicates to a bystander that an image is being taken and recorded—the bystander can then take action to protect their privacy.

Intentional sensing refers to usage such as object detection in which images are used for machine learning processing but are not being saved. A bystander indicator may be used in this case as well.

Ambient sensing refers to usage that determines a context in which the user is operating. For example, the user may be driving, and the wearable device may detect that the user is driving. Such detection may occur without the user doing anything or without the user's knowledge. Images taken with a world-facing camera are not saved. In this case, a bystander indicator is not used and the data should be kept private.

The need for privacy may complicate the ability to share data with a companion device in a split-compute architecture.

Wearable devices such as smartglasses can be configured to operate based on various constraints so that the smartglasses can be useful in a variety of situations. Example smart glasses constraints can include, for example, (1) smartglasses should amplify key services through wearable computing (this can include supporting technologies such as augmented reality (AR) and visual perception); (2) smartglasses should have sufficient battery life (e.g., last at least a full day of use on a single charge); and/or (3) smart glasses should look and feel like real glasses. Smartglasses can include AR and virtual reality (VR) devices. Fully standalone smartglasses solutions with mobile systems on chip (SoCs) that have the capability to support the desired features may not meet the power and industrial design constraints of smartglasses as described above. On-device compute solutions that meet constraints (1), (2) and/or (3) may be difficult to achieve with existing technologies.

A split compute architecture within smartglasses can be an architecture where the app runtime environment is at a remote compute endpoint, such as a mobile device, a server, the cloud, a desktop computer, the like, hereinafter often referred to as a companion device for simplicity. In some implementations, data sources such as IMU, camera sensors, and microphones (for audio data) can be streamed from the wearable device to the companion device. In some implementations, display content can be streamed from the compute endpoint back to the wearable device. In some implementations, because the majority of the compute and rendering does not happen on the wearable device itself, the split compute architecture can allow leveraging low-power MCU based systems. In some implementations, this can allow keeping power and ID in check, meeting at least constraints (1), (2) and/or (3). With new innovation in codecs and networking, it is possible to sustain the required networking bandwidth in a low power manner. In some implementations, a wearable device could connect to more than one compute endpoint at a given time. In some implementations, different compute endpoints could provide different services. In some implementations, with low-latency, high-bandwidth 5G connections becoming mainstream, compute endpoints could operate in the cloud.

In some implementations, a split compute architecture can move the application runtime environment from the wearable device to a remote endpoint such as a companion device (phone, watch) or cloud. Wearable device hardware only does the bare minimum, such as streaming of data sources (Camera, IMU, audio), pre-processing of data (e.g., feature extraction, speech detection) and finally the decoding and presentation of visuals.

Doing less on the wearable device can enable reducing the hardware and power requirements. In some implementations, a split-compute architecture may reduce the size of the temples. In some implementations, a split-compute architecture may enable leveraging large ecosystems. In some implementations, a split-compute architecture may enable building experiences that are no longer limited by the hardware capabilities of the wearable device.

Some companion devices have a sandbox/isolated module in which private data is kept apart from other modules on the companion device. For example, an operating system may have an open source, secure environment that is isolated from the rest of the operating system and apps. For example, sensitive data (e.g., sensor data) processed in such a secure environment is not shared to any apps without the user taking an action. Along these lines, until the user sends an indication, the OS keeps the user's reply hidden from both the key board and the app into which the user is typing.

A technical problem with the above-described private data usage is that the sandboxes that run on a companion device do not work with data from wearable devices in a split-compute architecture. For example, an isolated, secure environment does not have a facility that recognizes data from wearable devices in a split-compute architecture. Accordingly, the data generated by the wearable device during ambient or intentional sensing may not be kept private.

A technical solution to the above technical problem includes adding a trusted wearable services module to a sandbox/isolated module on the companion device. This trusted wearable services module has a secure connection to the camera on the wearable device (or another sensor of the wearable device) and prevents other modules on the companion device from viewing the private data. The trusted wearable service module has the ability to encrypt and decrypt data from the camera and also performs the processing used to determine user context (e.g., in an ambient sensing situation).

A technical advantage of the above-described technical solution is that the technical solution allows ambient and other sensing to be performed on a wearable device in a split-compute architecture while keeping data private from other modules on the companion device.

User context as used herein is a classification of what a user is doing in their environment. In one example, a user context indicates whether a user is driving or not, walking or not, or running or not. In some implementations, a user context indicates whether a user is moving quickly or slowly. In another example, a user context indicates whether the user is performing an action such as viewing an object or speaking with another person. The user context thus may be data indicating an activity of a user and/or characterizing an activity of a user.

Figure 1B:
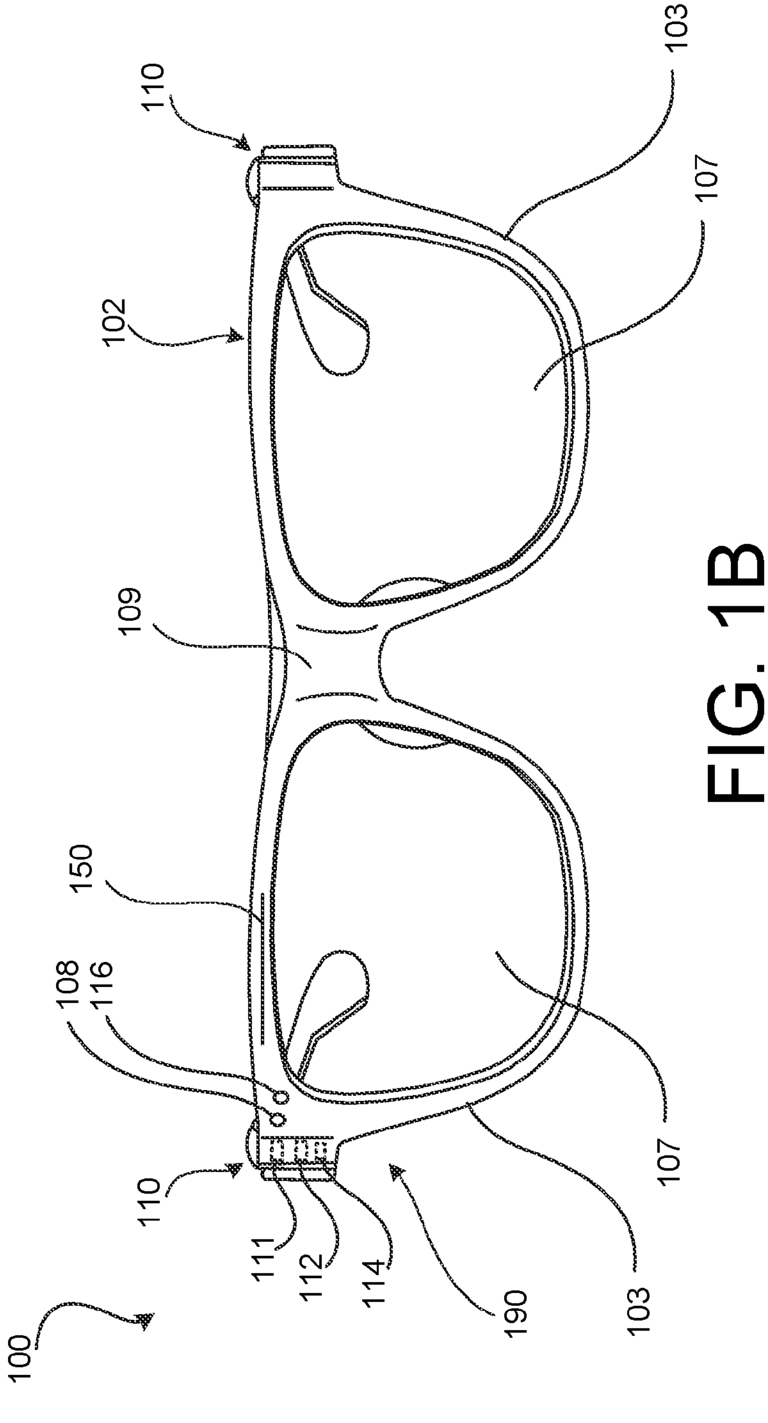
FIG. 1B is a front view.
Figure 1C:
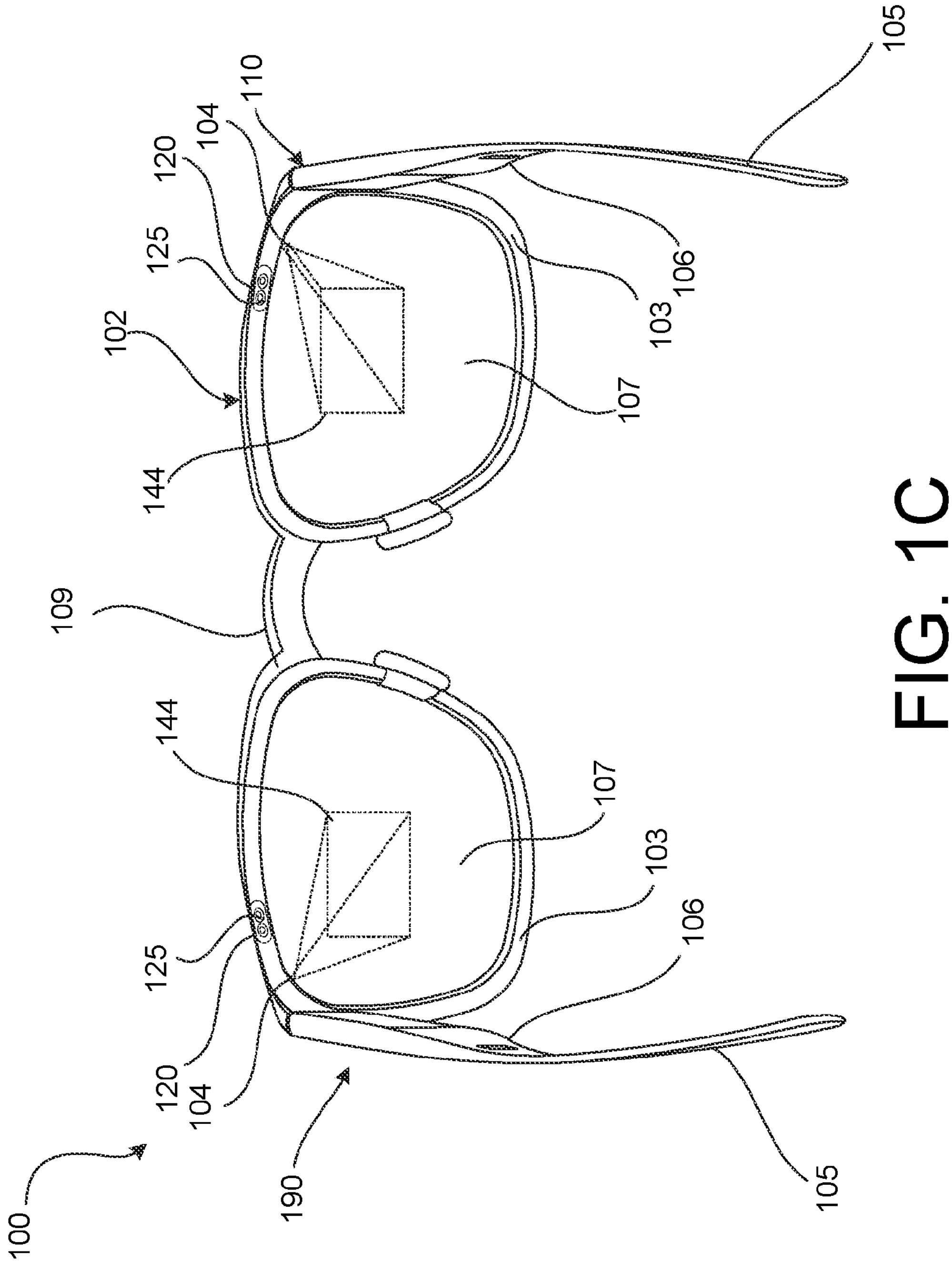
FIG. 1C is a rear view.
Figure 1D:
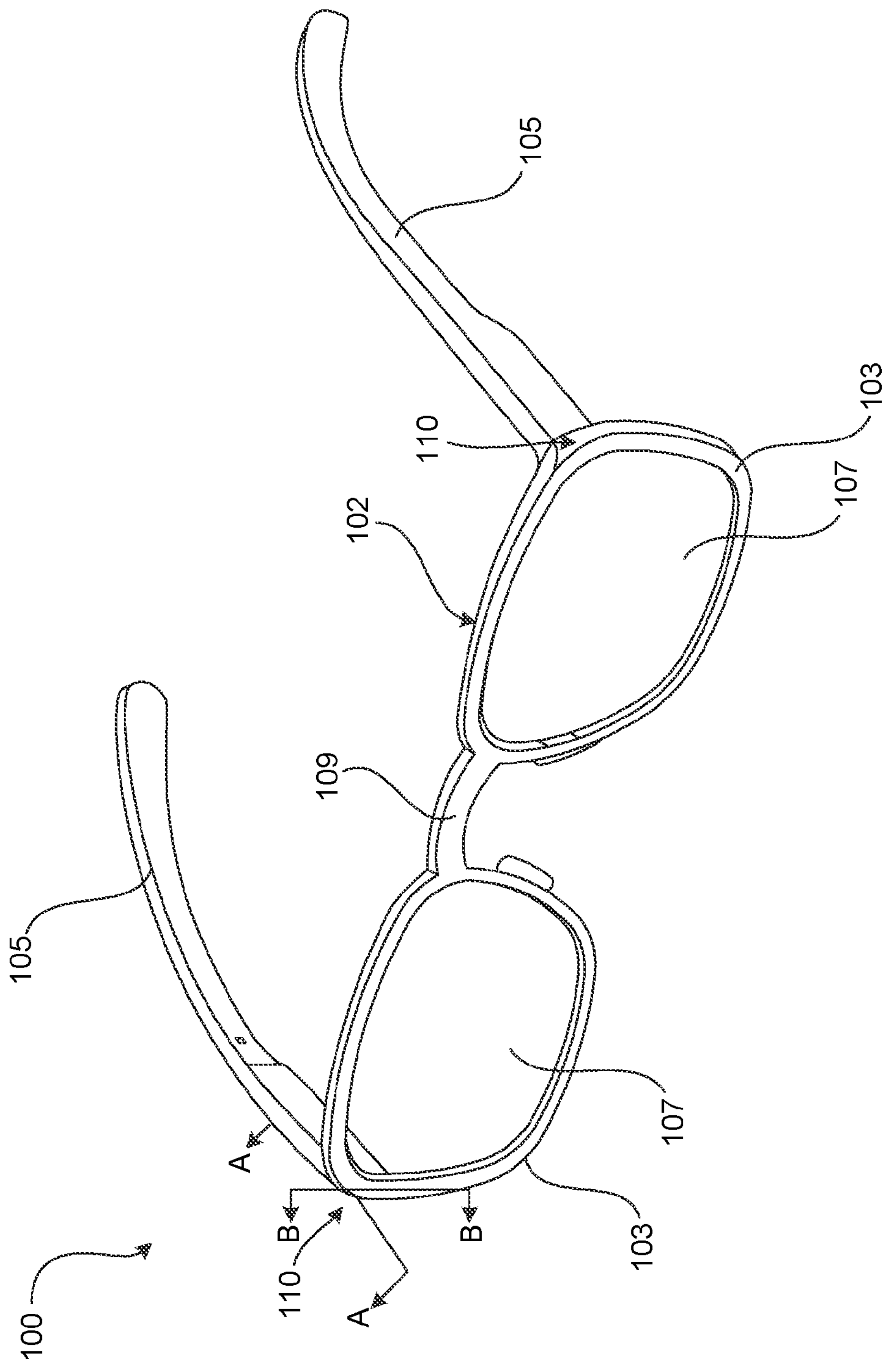
FIG. 1D is a perspective view, of the example head mounted wearable device shown in FIG. 1A, in accordance with implementations described herein.

FIG. 1A illustrates a user wearing an example head mounted wearable device 100. In this example, the example head mounted wearable device 100 is in the form of example smartglasses including display capability and computing/processing capability, for purposes of discussion and illustration. The principles to be described herein may be applied to other types of eyewear, both with and without display capability and/or computing/processing capability. FIG. 1B is a front view, FIG. 1C is a rear view, and FIG. 1D is a perspective view, of the example head mounted wearable device 100 shown in FIG. 1A. As noted above, in some examples, the example head mounted wearable device 100 may take the form of a pair of smartglasses, or augmented reality glasses. The head mounted wearable device 100 shown in FIGS. 1A through 1D includes a nose bridge 109, rim portions 103, and respective arm portions 105. The junctions between the rim portions 103 and arm portions 105 form shoulders. The material in the nose bridge 109 has a first bending stiffness and the material in the shoulders has a second bending stiffness such that the first bending stiffness and the second bending stiffness satisfy a specified relationship.

As shown in FIG. 1B-1D, the example head mounted wearable device 100 includes a frame 102 worn by a user. The frame 102 includes a front frame portion defined by rim portions 103 surrounding respective optical portions in the form of lenses 107, with a bridge portion 109 connecting the rim portions 109. Arm portions 105 are coupled, for example, pivotably or rotatably coupled, to the front frame by hinge portions 110 at the respective rim portion 103. In some examples, the lenses 107 may be corrective/prescription lenses. In some examples, the lenses 107 may be an optical material including glass and/or plastic portions that do not necessarily incorporate corrective/prescription parameters. A display device 104 may be coupled in a portion of the frame 102. In the example shown in FIGS. 1B and 1C, the display device 104 is coupled in the arm portion 105 of the frame 102. With the display device 104 coupled in the arm portion 105, an eye box 140 extends toward the lens(es) 107, for output of content at an output coupler 144 at which content output by the display device 104 may be visible to the user. In some examples, the output coupler 144 may be substantially coincident with the lens(es) 107. In some examples, the head mounted wearable device 100 can also include an audio output device 106 (such as, for example, one or more speakers), an illumination device 108, a sensing system 111, a control system 112, at least one processor 114, and an outward facing image sensor 116, or world-facing camera 116.

In some implementations, the at least one processor 114 is configured to capture and encrypt sensor data prior to transmission to a companion device. Moreover, in some implementations the at least one processor 114 is configured to transmit encrypted sensor data over a secure connection to the companion device.

Figure 2:
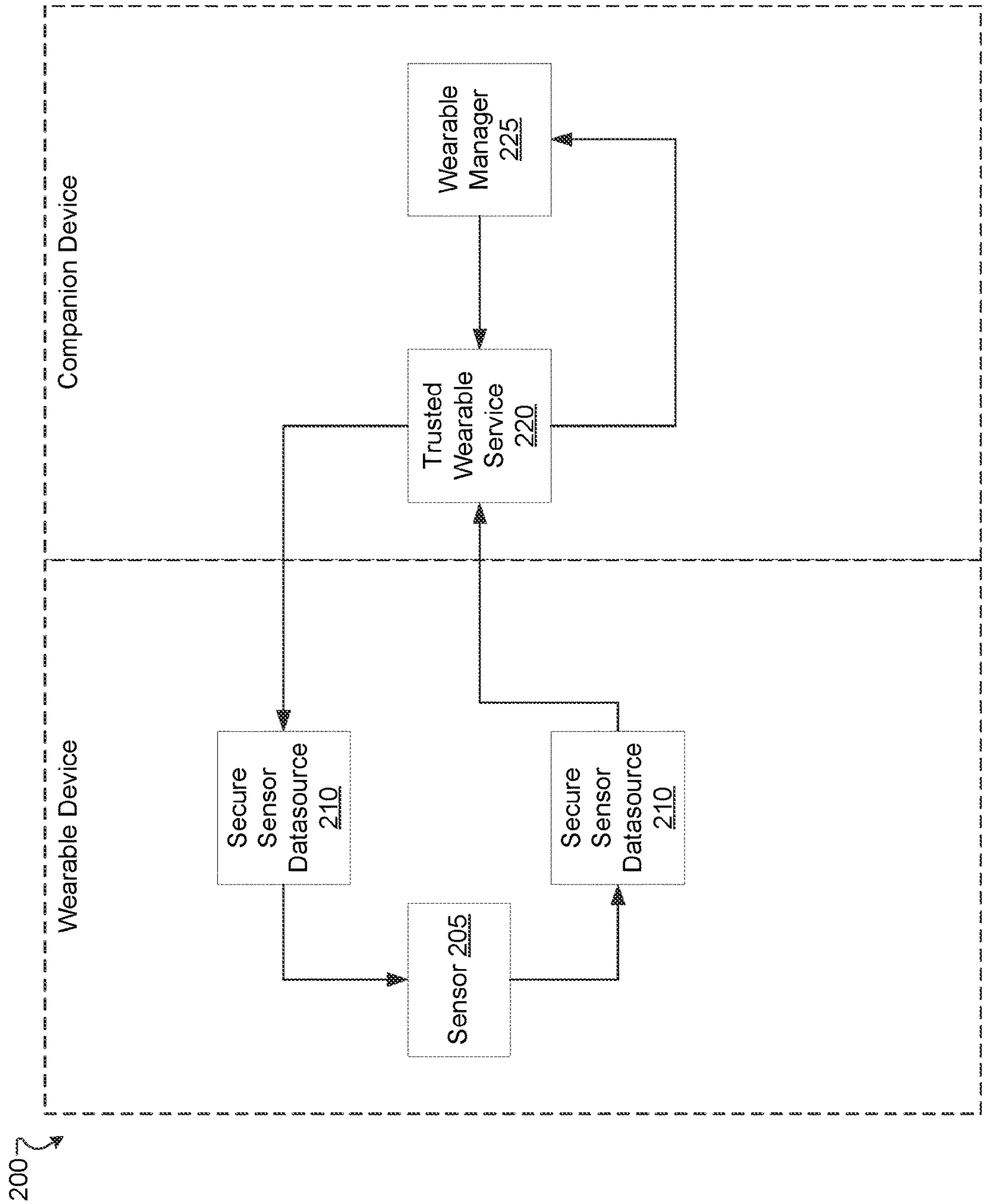
FIG. 2 is a diagram that illustrates an example isolated trusted wearable service on a companion device with respect to a wearable device and a wearable manager on the companion device.

FIG. 2 is a diagram that illustrates an example isolated trusted wearable service 220 on a companion device with respect to a wearable device and a wearable manager 225 on the companion device.

On the wearable device, there is at least one sensor 205. The at least one sensor 205 can include a world-facing camera, an inertial measurement unit (IMU), The at least one sensor 205 is configured to acquire sensor data, which in some cases has a privacy concern. For example, a world-facing camera may take an image of a bystander without the bystander's knowledge. Accordingly, such sensor data should be hidden from modules on the companion device that could use the sensor data in a way that would violate the privacy of the bystander.

As shown in FIG. 2, the sensor 205 on the wearable device is connected to a secure sensor datasource 210. The secure sensor datasource 210 is configured to encrypt the sensor data using an encryption scheme known to the trusted wearable service 220 only. In some implementations, the secure sensor datasource 210 uses public key cryptography to encrypt the sensor data. In such an implementation, the secure sensor datasource 210 has a public key from the trusted wearable services 220, which the secure sensor datasource 210 uses to encrypt the sensor data.

Moreover, the secure sensor datasource 210 is connected to the trusted wearable services 220 via a secure connection. In some implementations, the secure connection is a transport layer security (TLS) connection. In some implementations, the secure connection includes a QUIC protocol.

On the companion device, the trusted wearable service 220 is configured to determine user context based on the sensor data received from a remote endpoint such as the secure sensor datasource 210. In some implementations, the trusted wearable service 220 includes a machine learning engine. In some implementations, the machine learning engine is configured to take as input encrypted sensor data and output a user context (e.g., user is driving or user is not driving). In some implementations, the machine learning engine is configured to take as input decrypted sensor data; in such an implementation, the trusted wearable service is further configured to decrypt the encrypted sensor data prior to input into the machine learning engine. In some implementations, the decryption is performed using a private key corresponding to the public key used by the secure sensor datasource 210 to encrypt the sensor data.

In some implementations, the trusted wearable service 220 is part of a private computing sandbox used to isolate private data from other modules on the companion device. For example, when the companion device uses an open source, isolated secure environment, the trusted wearable service 220 is an extension of such an environment used to isolate private data of the companion device from other modules of the companion device. Accordingly, the trusted wearable services 220 is an extension of a sandbox in that the isolation is extended to data received from the wearable device.

In some implementations, the trusted wearable service 220 is configured to send a request to the secure sensor datasource 210 for sensor data. Such a request may be sent in response to a request from the wearable manager 225 for user context.

The wearable manager 225 is configured to request user context from the trusted wearable services 220 and to receive the user context once determined by the trusted wearable services 220. The wearable manager 225 is also configured to control other wearable computation tasks on the companion device. For example, once the wearable manager 225 receives a user context indicating that the user is driving, the wearable manager 225 can send that user context to other wearable-core modules configured to use the user context to perform other functions.

Figure 3:
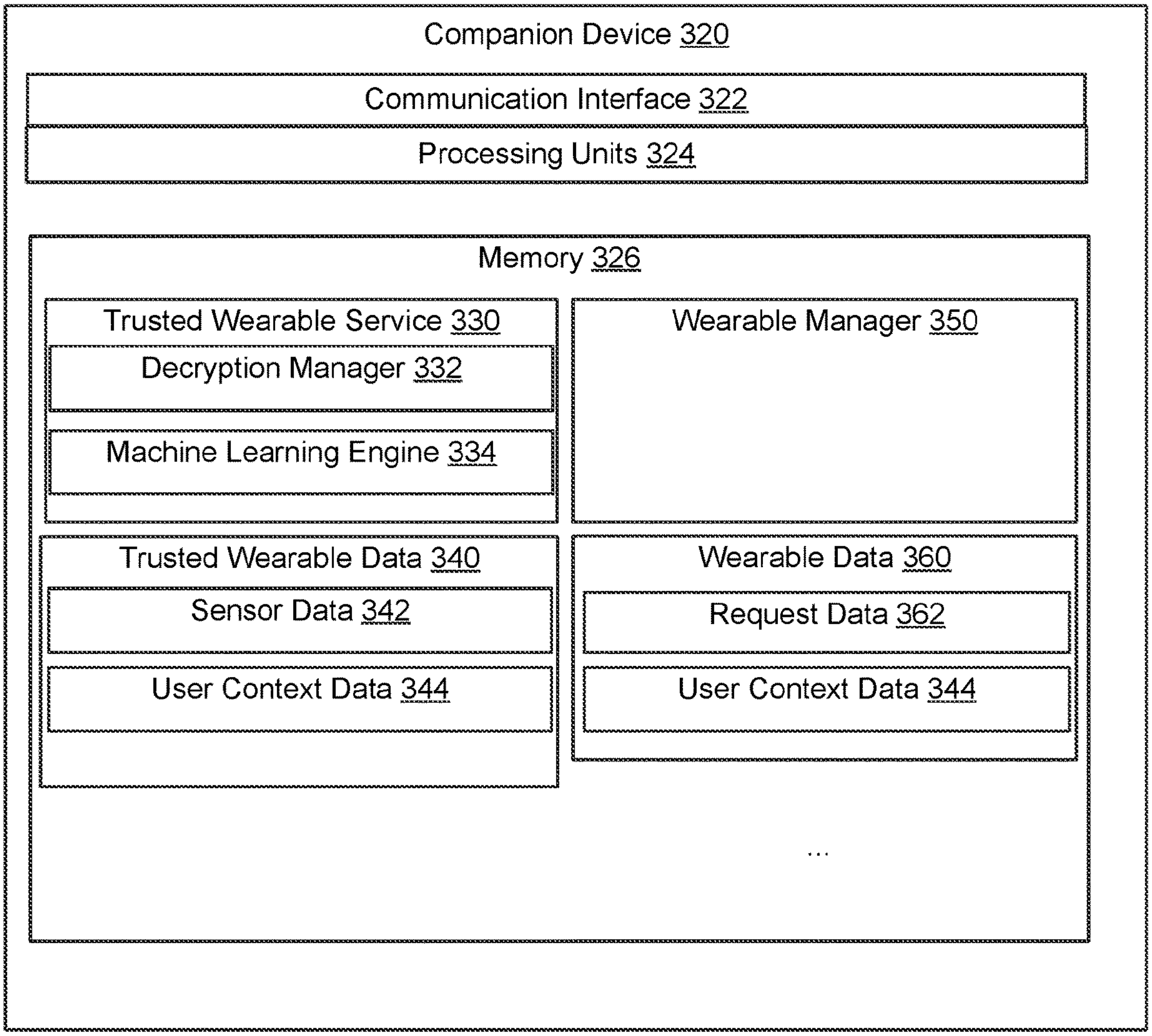
FIG. 3 is a diagram that illustrates an example companion device with a trusted wearable service for securely determining a user context.

FIG. 3 is a diagram that illustrates an example electronic environment for performing user context detection in an isolated module in a companion device 320. The companion device 320 includes a communication interface 322, one or more processing units 324, and nontransitory memory 326.

In some implementations, one or more of the components of the companion device 320 can be, or can include processors (e.g., processing units 324) configured to process instructions stored in the memory 326. Examples of such instructions as depicted in FIG. 3 include trusted wearable service 330 (an isolated module) and wearable manager 350. Further, as illustrated in FIG. 3, the memory 326 is configured to store various data, which is described with respect to the respective services and managers that use such data.

The trusted wearable service 330 is configured to perform operations on private data in isolation from other wearable application modules (e.g., wearable manager 350) of the companion device 320 in a split-compute architecture. The trusted wearable service corresponds to the trusted wearable service 220 in FIG. 2. As shown in FIG. 3, the trusted wearable service 330 includes a decryption manager 332 and a machine learning engine 334.

The decryption manager 332 is configured to perform decryption operations on sensor data (e.g., sensor data 342 of trusted wearable data 340). In some implementations, the encryption is public key encryption and the decryption operation is performed using the private key that generated the public key used for encryption. It is noted that the decryption operations cannot be performed outside of the trusted wearable service 330.

The machine learning engine 334 is configured to take as input sensor data (e.g., sensor data 342) and based on the input sensor data, produce user context data 344 representing a user context (e.g., is the user driving?). In some implementations, the machine learning engine 334 takes as input encrypted sensor data and the decryption manager 332 does not perform a decryption of the encrypted sensor data. In some implementations, the machine learning engine 334 includes a convolutional neural network.

The wearable manager 350 is configured to perform computations with regard to the wearable device connected to the companion device 320 in a split-compute environment. The wearable manager is isolated from the trusted wearable service 330 in that the wearable manager does not have access to private data used by or generated by the trusted wearable service. For example, the wearable manager 350 is configured to generate or receive wearable data 360 such as request data 362 representing a request for user context that is sent to the trusted wearable service 330. Also, the wearable manager 350 is configured to receive user context data 344 for use by wearable application modules on the companion device in the split-compute architecture.

The components (e.g., modules, processing units 324) of companion device 320 can be configured to operate based on one or more platforms (e.g., one or more similar or different platforms) that can include one or more types of hardware, software, firmware. operating systems, runtime libraries, and/or so forth. In some implementations, the components of the companion device 320 can be configured to operate within a cluster of devices (e.g., a server farm). In such an implementation, the functionality and processing of the components of the companion device 320 can be distributed to several devices of the cluster of devices.

The components of the companion device 320 can be, or can include, any type of hardware and/or software configured to process private data from a wearable device in a split-compute architecture. In some implementations, one or more portions of the components shown in the components of the companion device 320 in FIG. 3 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the companion device 320 can be, or can include, a software module configured for execution by at least one processor (not shown). In some implementations, the functionality of the components can be included in different modules and/or different components than those shown in FIG. 3, including combining functionality illustrated as two components into a single component.

The communication interface 322 includes, for example, wireless adaptors, and the like, for converting electronic and/or optical signals received from the network to electronic form for use by the companion device 320. The set of processing units 324 include one or more processing chips and/or assemblies. The memory 326 includes both volatile memory (e.g., RAM) and non-volatile memory, such as one or more ROMs, disk drives, solid state drives, and the like. The set of processing units 324 and the memory 326 together form processing circuitry, which is configured and arranged to carry out various methods and functions as described herein.

Although not shown, in some implementations, the components of the companion device 320 (or portions thereof) can be configured to operate within, for example, a data center (e.g., a cloud computing environment), a computer system, one or more server/host devices, and/or so forth. In some implementations, the components of the companion device 320 (or portions thereof) can be configured to operate within a network. Thus, the components of the companion device 320 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the companion device 320 can be, or can include, processors configured to process instructions stored in a memory. For example, trusted wearable services 330 (and/or a portion thereof) and wearable manager 350 (and/or a portion thereof) are examples of such instructions.

In some implementations, the memory 326 can be any type of memory such as a random-access memory, a disk drive memory, flash memory, and/or so forth. In some implementations, the memory 326 can be implemented as more than one memory component (e.g., more than one RAM component or disk drive memory) associated with the components of the companion device 320. In some implementations, the memory 326 can be a database memory. In some implementations, the memory 326 can be, or can include, a non-local memory. For example, the memory 326 can be, or can include, a memory shared by multiple devices (not shown). In some implementations, the memory 326 can be associated with a server device (not shown) within a network and configured to serve the components of the companion device 320. As illustrated in FIG. 3, the memory 326 is configured to store various data, including trusted wearable data 340 and wearable data 360.

Figure 4:
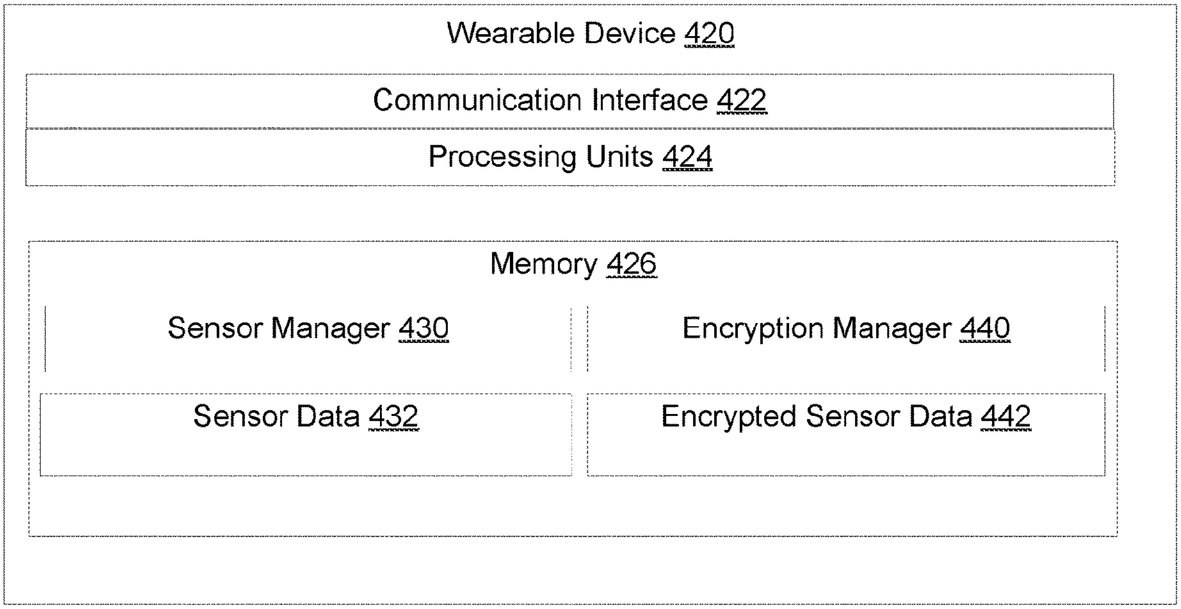
FIG. 4 is a diagram that illustrates an example wearable device for communicating with a trusted wearable service for securely determining a user context.

FIG. 4 is a diagram that illustrates an example wearable device 420 for providing private sensor data to a companion device (e.g., companion device 320). The wearable device 420 includes communication interface 422, one or more processing units 424, and nontransitory memory 426.

In some implementations, one or more of the components of the wearable device 420 can be, or can include processors (e.g., processing units 424) configured to process instructions stored in the memory 426. Examples of such instructions as depicted in FIG. 4 include sensor manager 430 and encryption manager 440. Further, as illustrated in FIG. 4, the memory 426 is configured to store various data, which is described with respect to the respective managers that use such data.

The sensor manager 430 is configured to generate sensor data 432 for use by the companion device. In one example, the sensor manager 430 acquires world-facing images from a world-facing camera on the wearable device 420; in this case, the sensor data is a world-facing image that may include a bystander. In another example, the sensor manager 430 acquires IMU data from an IMU of the wearable device 420.

The encryption manager 440 (corresponding to secure sensor datasource 210) is configured to perform an encryption operation on the sensor data 432 to produce encrypted sensor data 442. In some implementations, the encryption manager 440 uses a public key sent by an isolated trusted wearable services module (e.g., trusted wearable services 330) running on the companion device to effect the encryption. In some implementations, the encryption manager 440 is configured to send the encrypted sensor data 442 to the isolated trusted wearable services module over a secure connection, e.g., a transport layer security (TLS) connection.

The components (e.g., modules, processing units 424) of wearable device 420 can be configured to operate based on one or more platforms (e.g., one or more similar or different platforms) that can include one or more types of hardware, software, firmware, operating systems, runtime libraries, and/or so forth. In some implementations, the components of the wearable device 420 can be configured to operate within a cluster of devices (e.g., a server farm). In such an implementation, the functionality and processing of the components of the companion device 305 can be distributed to several devices of the cluster of devices.

The communication interface 422 includes, for example. Ethernet adaptors, Token Ring adaptors, and the like, for converting electronic and/or optical signals received from the network to electronic form for use by the wearable device 420. The set of processing units 424 include one or more processing chips and/or assemblies. The memory 426 includes both volatile memory (e.g., RAM) and non-volatile memory, such as one or more ROMs, disk drives, solid state drives, and the like. The set of processing units 424 and the memory 426 together form processing circuitry, which is configured and arranged to carry out various methods and functions as described herein.

The components of the wearable device 420 can be, or can include, any type of hardware and/or software configured to acquire and encrypt sensor data for split compute environments. In some implementations, one or more portions of the components shown in the components of the wearable device 420 in FIG. 4 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the wearable device 420 can be, or can include, a software module configured for execution by at least one processor (not shown). In some implementations, the functionality of the components can be included in different modules and/or different components than those shown in FIG. 4, including combining functionality illustrated as two components into a single component.

Although not shown, in some implementations, the components of the wearable device 420 (or portions thereof) can be configured to operate within, for example, a data center (e.g., a cloud computing environment), a computer system, one or more server/host devices, and/or so forth. In some implementations, the components of the wearable device 420 (or portions thereof) can be configured to operate within a network. Thus, the components of the wearable device 420 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the companion device 305 can be, or can include, processors configured to process instructions stored in a memory. For example, sensor manager 430 (and/or a portion thereof) and encryption manager 440 (and/or a portion thereof) are examples of such instructions.

In some implementations, the memory 426 can be any type of memory such as a random-access memory, a disk drive memory, flash memory, and/or so forth. In some implementations, the memory 426 can be implemented as more than one memory component (e.g., more than one RAM component or disk drive memory) associated with the components of the wearable device 420. In some implementations, the memory 426 can be a database memory. In some implementations, the memory 426 can be, or can include, a non-local memory. For example, the memory 426 can be, or can include, a memory shared by multiple devices (not shown). In some implementations, the memory 426 can be associated with a server device (not shown) within a network and configured to serve the components of the wearable device 420. As illustrated in FIG. 4, the memory 426 is configured to store various data, including sensor data 432 and encrypted sensor data 442.

Figure 5:
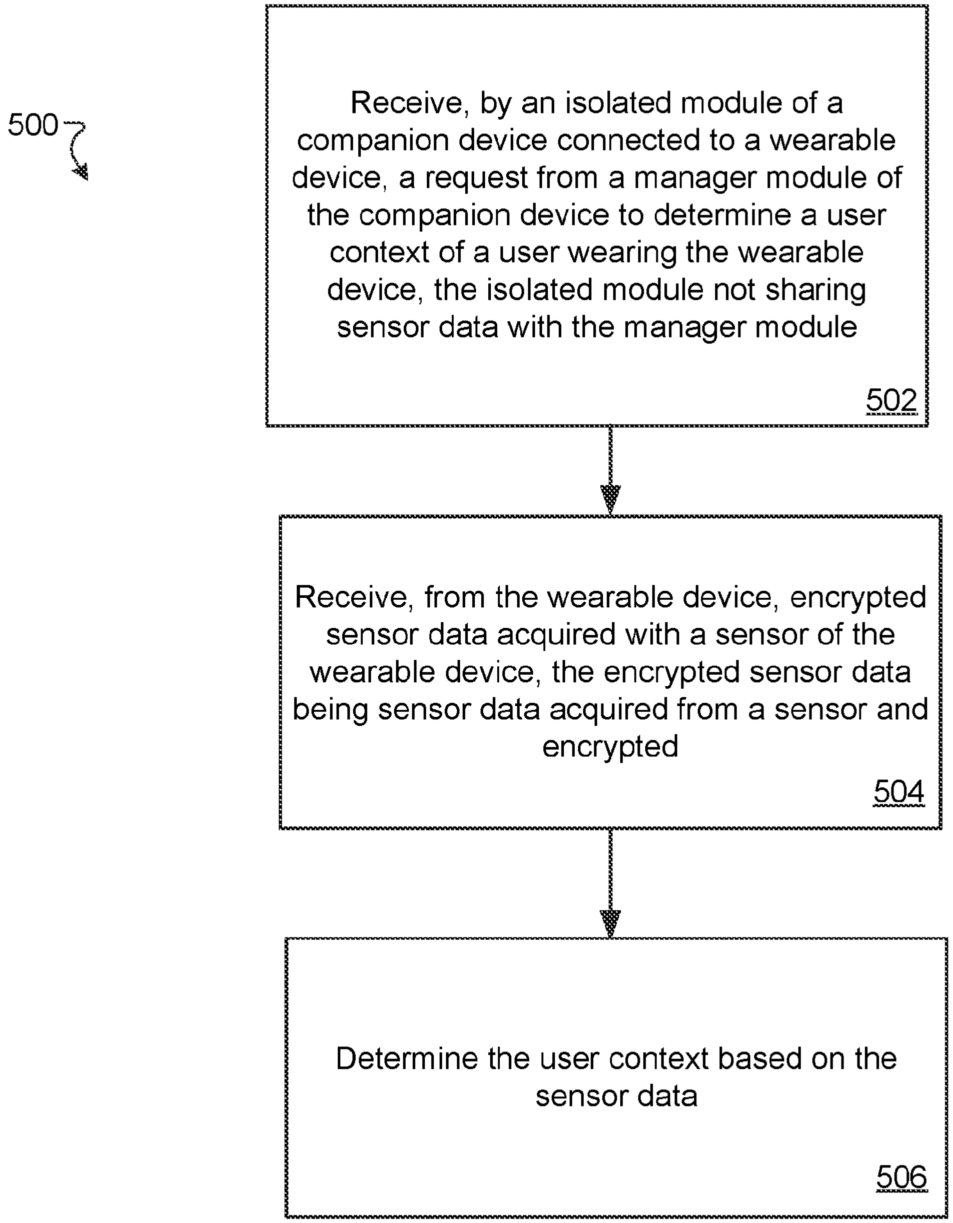
FIG. 5 is a flow chart that illustrates an example method of securely determining a user context.

FIG. 5 is a flow chart that illustrates an example method 500 of determining user context in a split-compute architecture. The method 500 may be performed using an isolated module (e.g., trusted wearable service 330) of FIG. 3.

At 502, the isolated module receives a request from a manager module (e.g., wearable manager 350) of a companion device (e/g/, companion device 320) to determine a user context (e.g., user context data 344) of a user wearing a wearable device (e.g., wearable device 420), the isolated module not sharing sensor data with the manager module, the user context including an environment in which the user is using the wearable device.

At 504, the isolated module receives, from the wearable device, encrypted sensor data (e.g., sensor data 342) acquired with a sensor of the wearable device, the encrypted sensor data being sensor data acquired from a sensor and encrypted.

At 506, the isolated module determines the user context based on the sensor data.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A method, comprising:

receiving, by a first module of a companion device connected to a wearable device, a request, from a second module of the companion device, to determine a user context of a user wearing the wearable device, the first module isolating, from the second module, data acquired from a sensor of the wearable device;

receiving, from the wearable device, encrypted data acquired with the sensor, the encrypted data being the data after an encryption; and determining the context of the user based on the data.

2. The method as in claim 1, further comprising:

establishing a secure connection with the wearable device.

3. The method as in claim 2, wherein the secure connection includes a transport layer security (TLS) protocol.

4. The method as in claim 1, wherein the sensor is a world-facing camera and the encrypted data includes an encrypted image, the encrypted image being an image acquired with the world-facing camera after the encryption.

5. The method as in claim 1, further comprising:

sending information representing the context to the second module.

6. The method as in claim 1, wherein the context includes an environment in which the user is driving.

7. The method as in claim 1, wherein determining the context includes:

inputting the data into a model, the model being configured to determine the context based on the data.

8. The method as in claim 7, wherein determining the context further includes:

decrypting the encrypted data before inputting the data into the model.

9. A computer program product comprising a non-transitory storage medium, the computer program product including code that, when executed by at least one processor, causes the at least one processor to perform a method, the method comprising:

receiving, by a first module of a companion device connected to a wearable device, a request, from a second module of the companion device, to determine a context of a user wearing the wearable device, the first module isolating, from the second module, data acquired from a sensor of the wearable device;

receiving, from the wearable device, encrypted sensor data acquired with the sensor, the encrypted data being the data after an encryption; and determining the context of the user based on the data.

10. The computer program product as in claim 9, wherein the method further comprises:

establishing a secure connection with the wearable device.

11. The computer program product as in claim 10, wherein the secure connection includes a transport layer security (TLS) protocol.

12. The computer program product as in claim 9, wherein the sensor is a world-facing camera and the encrypted data includes an encrypted image, the encrypted image being an image acquired with the world-facing camera after the encryption.

13. The computer program product as in claim 9, wherein the method further comprises:

sending information representing—the context to the second module.

14. The computer program product as in claim 9, wherein the context includes an environment in which the user is driving.

15. The computer program product as in claim 9, wherein determining the context includes:

inputting the data into a model, the model being configured to determine the context based on the data.

16. The computer program product as in claim 15, wherein determining the context further includes:

decrypting the encrypted data before inputting the data into the model.

17. An apparatus, comprising:

memory; and processing circuitry coupled to the memory, the processing circuitry being configured to:

receive, by a first module of a companion device connected to a wearable device, a request, from a second module of the companion device, to determine a context of a user wearing the wearable device, the first module isolating, from the second module, data acquired from a sensor of the wearable device;

receive, from the wearable device, encrypted data acquired with the sensor, the encrypted data being the data after an encryption; and determine the context of the user based on the data.

18. The apparatus as in claim 17, wherein the processing circuitry is further configured to:

establish a secure connection with the wearable device.

19. The apparatus as in claim 18, wherein the secure connection includes a transport layer security (TLS) protocol.

20. The apparatus as in claim 17, wherein the sensor is a world-facing camera and the encrypted data includes an encrypted image, the encrypted image being an image acquired with the world-facing camera after the encryption.

21. The apparatus as in claim 17, wherein the processing circuitry is further configured to:

send information representing—the context to the second module.

22. The apparatus as in claim 17, wherein the context includes an environment in which the user is driving.

23. The apparatus as in claim 17, wherein the processing circuitry configured to determine the context is further configured to:

input the data into a model, the model being configured to determine the context based on the data.

24. The apparatus as in claim 23, wherein the processing circuitry configured to determine the context is further configured to:

decrypt the encrypted data before inputting the data into the model.

* * * * *